United States Patent

Hardin

[15] 3,654,690
[45] Apr. 11, 1972

[54] METHOD FOR REMOVING BROKEN STUDS

[72] Inventor: Wise J. Hardin, 301 Lexington Avenue, Box 22, Volusia County, Fla. 32763

[22] Filed: July 2, 1970

[21] Appl. No.: 52,004

[52] U.S. Cl..................................29/427, 29/240, 81/71, 408/1
[51] Int. Cl........................................B23p 19/06
[58] Field of Search..................29/240, 401, 427; 408/223, 408/224, 230; 81/71

[56] References Cited

UNITED STATES PATENTS

| 252,704 | 1/1882 | Southwick | 408/224 |
| 396,663 | 1/1889 | Morisseau | 408/224 X |
| 2,752,671 | 7/1956 | Alyea | 29/240 X |
| 3,076,356 | 2/1963 | Simich | 408/223 |
| 3,325,890 | 6/1967 | Sandor | 29/432 |

*Primary Examiner*—Francis S. Husar
*Assistant Examiner*—Michael Koczo, Jr.
*Attorney*—Duckworth and Hobby

[57] ABSTRACT

A method for removing a broken threaded member from a tapped bore including a drill bit adapted for rotation in the same direction required to withdraw the broken threaded member and in which a portion of the drill bit between the ends thereof has an expanding diameter to increase the torque for removing the broken threaded member when the drill bit had drilled sufficiently into the broken threaded member to reach the expanding portion.

2 Claims, 4 Drawing Figures

PATENTED APR 11 1972 3,654,690

WISE J. HARDIN
INVENTOR

BY Duckworth & Hobby

ATTORNEY

METHOD FOR REMOVING BROKEN STUDS

BACKGROUND OF THE INVENTION

The present invention relates to removing of broken threaded members from tapped bores and more particularly to a method for removing a broken stud, screw, tap, bolt, and the like, from a tapped bore, utilizing reversible drills.

In the past broken studs, screws, taps, and the like, have been removed in a number of ways, one of the most common being to mark the exact center of the broken stud with a center punch, drill out as much of the stud as possible, and then rethread the drilled hole using a tap and tap wrench. This method, however, tends to cut new threads over the old threads, and thus providing weaker new threads. It is also time consuming and very difficult to drill a hole down the broken stud.

Another way used to remove a broken stud is by drilling a short distance into the broken stud and then wedging a diamond point chisel, or the like, into the hole and attempting to rotate the chisel with a wrench to unscrew the stud. A similar method requires drilling out the stud, inserting a "-screw retractor" which is a tool much like a corkscrew which grips the sides of the drilled hole. A wrench is then used to twist the extractor to remove the broken stud. These methods tend to wedge the broken studs in tighter, in addition to the problems of accurately drilling out the broken stud without damaging the internal threads engaging the stud threads. Similarly, the drilled stud could be collapsed for removal but this risks damage to the internal thread during drilling as well as during collapsing.

In addition to the above methods, broken taps may be removed with a broken tap remover which merely has fingers for inserting along the flutes of the broken tap. A wrench is then used to rotate the extractor for removing the tap. Taps may also be removed by inserting a chisel or a punch in one of the broken tap flutes and striking the chisel light blows with a hammer. These methods are, of course, available only for use with broken taps and not with studs, bolts, screws, or the like.

Finally, it has been suggested to use a rotary tool with a graduated bit for removing expanded tubes, and it has also been suggested to press the tip of a drill against a broken member and rotate the drill bit in the same direction required to withdraw the broken member while the drill bit is engaging the broken member. This latter member, however, tends to drill out the entire broken stud if the stud is tightly frozen, as would generally be the case in broken off studs. It is accordingly an object of the present invention to provide an apparatus and method of removing broken studs, and the like, which is simple and economical while being more effective than many of the prior art devices and which will not under normal conditions damage the tap or bore from which the stud is being removed.

SUMMARY OF THE INVENTION

A drill bit method is provided for removing a broken threaded member from a tapped bore in which the drill bit, having an elongated body with two ends is provided in which one end has the cutting edges of the drill tip connected to the flutes, or the like, in a typical twist drill fashion except the bit is adapted for drilling when rotated in the direction required to withdraw a broken threaded member from a tapped bore. Between the ends of the drill bit the diameter of the drill bit begins to expand for a predetermined distance along its axis whereby during the drilling operation the torque will be increased when the drill reaches the expanding diameter portion of the drill bit forcing the threaded member from the tap bore without damage to the tapped bore by the increased torque of the expanded portion being applied to the broken threaded member. The expanding diameter can be by means of a continuous expanding twist drill, flutes or by other methods such as elongated space cutting members placed between the ends of a drill.

The method of the present invention includes drilling coaxially along a longitudinal axis of a broken threaded member by rotating a drill bit in the same direction required to withdraw the broken threaded member from a tap bore and increasing the torque by continuing to drill through an expanded diameter portion of a drill bit to force the broken threaded member to withdraw back out of the tap bore.

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
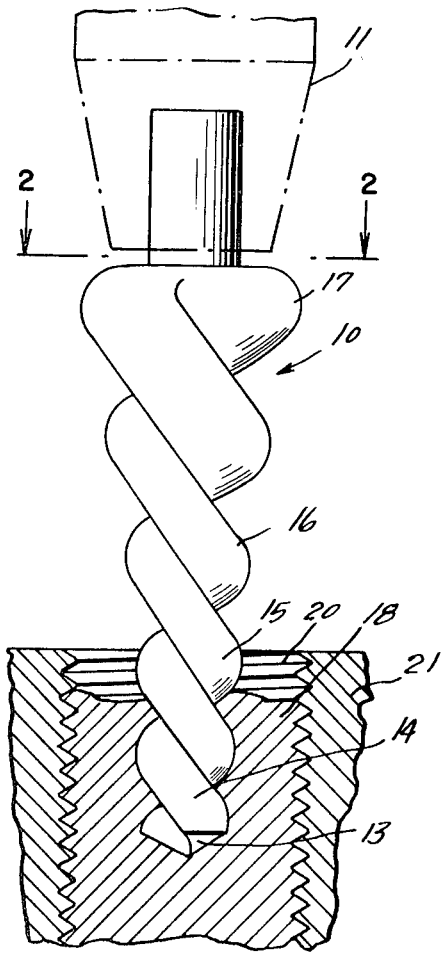
FIG. 1 is a perspective view of one embodiment of a drill in accordance with the present invention in the process of removing a broken stud.

Referring now to FIG. 1, there can be seen a drill bit 10 attached to the chuck 11 of a drill, chuck 11 being shown in dashed lines and will be tightened onto shank 12, which shank is adapted for inserting into a drill chuck 11 similar to that found in most small electric drills but which of course could be used with hand powered drills, or the like. The drill bit 10 has a cutting edge 13 and flutes 14 which flutes run in a generally helical manner forming grooves 15 which helix starts with a substantially uniform diameter drill bit but has an increasing diameter 16 which diameter gradually increases until it contacts a shank of the drill bit 10. Drill bit 10 is shown drilling into a threaded member or stud 18 which has been broken off in a tapped bore 20 formed in a piece of material 21. The flutes 14, cutting edge 13 and drill 10, will run in a generally opposite direction from most drill bits in that the direction of rotation is a counter-clockwise or lefthand as would normally be required to remove a typical righthand threaded member. However, this situation will be exactly reversed in the case of a lefthanded threaded member and the drilling and cutting edge will have to be designed for drilling in a clockwise direction. However, common small electric drills, and the like, today frequently may be operated to rotate in either a clockwise or counter-clockwise direction as desired so that with a proper bit inserted into a chuck 11 of such an electric drill the bit 10 will begin to drill into the broken stud 18. As the drill is drilled into the stud it will gradually reach the area 16 where the drill bit begins to get larger in diameter putting a greater torque on the threaded member 18 applied in the rotational direction necessary to withdraw or unscrew the broken stud 18. This increased torque will force the broken member 18 to be withdrawn from the threaded bore 20.

Figure 2:
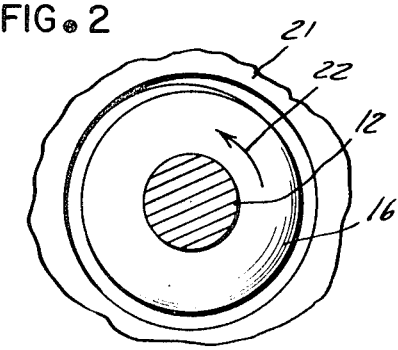
FIG. 2 shows a view taken along line 2—2 of FIG. 1.

Referring now to FIG. 2, shank 12 can be seen connected to the flute expanded portion 16, top 17, having a direction going counter-clockwise as illustrated by the arrow 22 for removing a broken stud in a piece of material such as a block 21.

Figure 3:
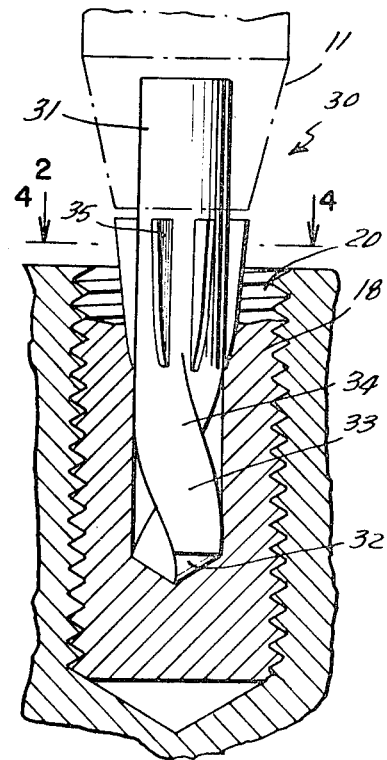
FIG. 3 is a perspective view of yet a second embodiment of the present invention in the process of removing a broken stud.

Referring now to FIG. 3, a chuck 11 is shown connected to a bit 30, shank 31, which drill bit 30 is in the process of drilling a broken stud 18 which is threaded into a tap bore 20 of a block of material 21. Drill bit 30 has a cutting edge 32 in a generally uniform diameter portion 33 with flutes 34 and approximately half way up the drilling portion of the bit has several torque increasing members 35 attached thereto and running parallel to the longitudinal axis of the drill bit 30, each such torque increasing member gradually increasing in diameter for operation in a manner similar to that of FIGS. 1 and 2.

Figure 4:
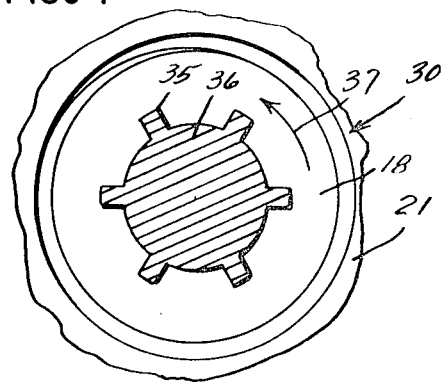
FIG. 4 is a view taken along line 4—4 of FIG. 3.

FIG. 4 illustrates more clearly the rotation of a drill bit 30 having a center portion 36 and a torque increasing member 35 rotating counter-clockwise in accordance with the arrow 37 for drilling out a stud 18 broken off in the material 21.

As can be seen from the drawings 1-4, a method of removing a broken threaded member is provided in which a drill bit adapted for drilling by rotating in the same direction as would be required to remove the broken threaded member is provided and the drilling continues until the twist drill reaches a point in which the drill bit increases in diameter along its longitudinal axis which increase in diameter engages the broken stud, substantially increasing the torque being applied to the broken threaded member, forcing the broken threaded member to withdraw from tapped bore without damage to the threads of the tapped bore.

It will of course be realized that the shape of the cutting edges 13 and 32 may be varied as desired, but should cut in accordance with the direction that the drill will be rotating which is the same as required to remove the studs 18 and that similarly the flutes 14 and 33 will be in a direction depending upon the rotation of the drill, without departing from the spirit and scope of the present invention.

Other variations are also contemplated and this invention is not to be construed as limited to the particular forms disclosed herein since these are to be regarded as illustrative rather than restrictive.

I claim:

1. A method of removing broken threaded members from a tapped bore comprising in combination the steps of drilling coaxially along the longitudinal axis of said broken threaded member, said drill bit being rotated in the same direction required to withdraw said broken threaded member from said tapped bore and increasing the torque on said broken threaded member by continuing said drilling through an expanding diameter portion on said drill bit thereby increasing the torque to remove said broken threaded member from said tapped bore.

2. The method in accordance with claim 1 including maintaining a substantially constant drilling pressure on said broken threaded member until said expanded diameter portion of said drill is reached and on increasing said pressure when the said expanding diameter of said drill bit begins.

* * * * *